United States Patent [19]  
Kurikami

[11] 3,875,287  
[45] Apr. 1, 1975

[54] REMOVING MERCURY FROM CONCENTRATED SULFURIC ACID USING IODIDES

[75] Inventor: Toshio Kurikami, Annaka, Japan

[73] Assignee: Toho Aen Kabushiki Kaisha, Tokyo-to, Japan

[22] Filed: Aug. 7, 1973

[21] Appl. No.: 386,433

[30] Foreign Application Priority Data
 Aug. 15, 1972 Japan.............................. 47-81556
 Jan. 29, 1973 Japan.............................. 48-11692

[52] U.S. Cl.................. 423/101, 423/491, 423/531
[51] Int. Cl...................... C01g 13/04, C01b 17/90
[58] Field of Search ............ 423/101, 102, 491, 531

[56] References Cited
FOREIGN PATENTS OR APPLICATIONS
1,054,972  4/1959  Germany ............................. 423/531
1,216,263  5/1966  Germany ............................. 423/531

OTHER PUBLICATIONS

Mellov: A Treatise On Inorganic and Theoretical Chemistry, Vol. 4 (1923), p. 902 and p. 915.
Pascal: Nouveau Traité De Chimie Minérale, Vol. V (1962), p. 542.

*Primary Examiner*—Oscar R. Vertiz
*Assistant Examiner*—Brian E. Hearn
*Attorney, Agent, or Firm*—Holman & Stern

[57] ABSTRACT

A method of removing mercury from a highly concentrated sulfuric acid which comprises adding iodides to said sulfuric acid to precipitate mercury contained therein as mercuric iodide and removing the precipitate from said sulfuric acid. The method makes it possible to remove the mercury contained in the sulfuric acid rapidly almost without being affected by the mercury content thereof and to recover the removed mercury and further requires no large scale installation.

16 Claims, No Drawings

REMOVING MERCURY FROM CONCENTRATED SULFURIC ACID USING IODIDES

BACKGROUND OF THE INVENTION

The present invention relates to a process of removing mercury from a highly concentrated sulfuric acid having a concentration of not less than 70 percent.

In general, industrial sulfuric acid contains a trace of mercury which may be estimated to amount to 0.1 to 30 mg/kg. It is well known that among heavy metals, mercury is especially harmful to the human body, and thus sulfuric acid containing a trace of mercury is, in itself, forced to have limited uses. In addition, it is desirable from an environmental pollution point of view that mercury contained in sulfuric acid is in an amount of as little as possible. Most of mercury is introduced into sulfuric acid from the starting meterials thereof. For example, many sulfide ores of metals contain mercury though it is in a very small amount. When these ores are used as the first raw material in the production of sulfuric acid, there is produced sulfur dioxide which is, in turn, used as the second raw material to produce sulfuric acid. A major portion of mercury contained in the raw ores is entrained in the sulfur dioxide, and the entrained mercury is incorporated into sulfuric acid produced therefrom.

In order to produce sulfuric acid with a low content of mercury, choosing of the raw ores with a low content of mercury is desirable, but it is not practicable from an industrial point of view. Several methods have been known which include removing of mercury at the refining process of sulfur dioxide which is used as a direct material for producing sulfuric acid. For example, one method is one that comprises washing sulfur dioxide with concentrated sulfuric acid at a high temperature to remove mercury contained therein and another method is one that comprises rapidly cooling and condensing mercury in a vapor phase contained in sulfur dioxide to recover it.

The first method is not always practicable because it requires a relatively large scale installation wherein a large amount of sulfuric acid should be circulated therethrough and the operations should be carried out under the limited conditions of the gas. On the other hand, the second method has no reliability in respect of high removal efficiency. Further, a variety of methods have been proposed which are intended to remove mercury contained in the produced sulfuric acid. For example, there is known a process of removing mercury contained in sulfuric acid which comprises reacting the sulfuric acid with hydrogen sulfide in the presence of activated carbon to convert the mercury contained therein to sulfides. There is also known another process of removing mercury contained in sulfuric acid which comprises bringing the sulfuric acid into contact with catalysts containing platinum group metals.

However, all these methods are applicable only when the sulfuric acid is low in concentration, and there has not been found any useful method which may be applied to concentrated sulfuric acid or the similar sulfuric acid frequently used at the present day.

SUMMARY OF THE INVENTION

It is an object of the invention to provide a method of removing mercury contained in a highly concentrated sulfuric acid.

The above-stated object can be accomplished by the method of the present invention which comprises adding iodides to a highly concentrated sulfuric acid having a concentration of not less than 70 percent and containing a trace of mercury to precipitate the mercury contained in said sulfuric acid as mercuric iodides, and removing the precipitate from said sulfuric acid.

DETAILED DESCRIPTION OF THE INVENTION

Mercury is present in the form of both metal and ion in sulfuric acid, and if iodine is added to the sulfuric acid, it is expected that mercuric iodide is precipitated according to the following equations:

$$Hg + I_2 \rightarrow HgI_2 \tag{1}$$

$$Hg^{2+} + 2I^- \rightarrow HgI_2 \tag{2}$$

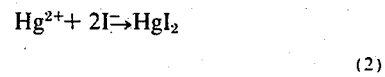

However, the reaction rate of these equations (1) and (2) in the sulfuric acid is practically so slow that the reactions scarcely proceed.

In view of the fact that the mercuric iodide itself is very difficult to dissolve in the sulfuric acid with a high concentration, the applicants have made studies to convert the mercury contained in sulfuric acid to the mercuric iodide with a high efficiency. As a result, they discovered that such object could be achieved by using iodides, including potassium iodide. If the iodides such as potassium iodide are added to the sulfuric acid at room temperature and the mixture is stirred, the mercury contained therein is rapidly precipitated as the mercuric iodide.

It is assumed that the reaction is carried out according to the following reaction equations:

$$2KI + 3H_2SO_4 \rightarrow 2KHSO_4 + 2I + 2H_2O + SO_2 \tag{3}$$

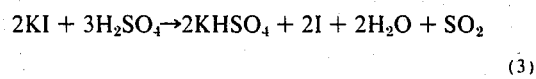

$$2I + Hg \rightarrow HgI_2 \tag{4}$$

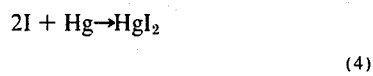

The equation (3) is followed by the equation (4) in a very short period of time. That is, the potassium iodide in the concentrated sulfuric acid decomposes into iodine and potassium, and the produced iodine in a nascent state combine rapidly with the mercury contained in the concentrated sulfuric acid, whether it is present in a metallic or ionic state. Therefore, it is one important requirement that the iodine is in a chemically active state. In other words, it appears that the higher the concentration of the sulfuric acid, the greater the effect of the addition of the iodides, and that with sulfuric acid having a lower concentration iodides are of little usefulness. From the fact that the addition of iodates gives no effect, it may be confirmed that it depends on the action of active iodine to give the formation of the mercuric iodide. The critical concentration of sulfuric acid for which the iodides to be added is useful may be expected to be in the range of 50 to 70 percent. However, the applicants adopted the sulfuric acid in concentration range of not less than 70 percent as a preferred range in the present invention.

Although the reaction between the nascent iodine from the decomposition of the iodides and the mercury is rapidly effected, the iodides are preferably added to the sulfuric acid with stirring taking into consideration the diffusion of the iodides to be added and the decomposed products thereof into the solution of the sulfuric acid. However, stirring requires no long period of time. The reaction is selective, and it proceeds without being affected by any other metal impurities present in sulfuric acid. With regard to the removal of these metal impurities, many kinds of methods have been hitherto taken and there is no particular problem.

The formation of the mercuric iodide by the iodides occurs almost absolutely without depending upon the mercury content of sulfuric acid. The iodides may be added in an amount of at least chemical equivalent, preferably 1 to 2 times chemical equivalent required to convert mercury to mercuric iodide to provide satisfactory results. The amount above several times chemical equivalent may be, of course, added, but further advantage cannot be obtained with such excessive amounts because of the selectivity of the reaction as stated above.

While the mercuric iodide is stable in the highly concentrated sulfuric acid at a temperature below room temperature, it tends to be dissolved in the highly concentrated sulfuric acid at an elevated temperature. Thus, the addition of iodides may be advantageously effected at a lower temperature, preferably, at a temperature not higher than 30°C, more preferably at a temperature not higher than 15°C, still more preferably not higher than 10°C. In this respect, consideration should be given to the fact that the dissolution and the precipitation process of mercuric iodide in sulfuric acid is somewhat reversible relative to heat.

The iodides used in the present invention may include any kinds of iodides, including potassium iodide, and in practice, they may be advantageously selected on the basis of the reasons of convenience, economy and the like.

The method of the present invention for removal of mercury from highly concentrated sulfuric acid by the addition thereto of iodides is characterized in that it is specific to iodides, i.e., when other halides such as chlorides or bromides are added to concentrated sulfuric acid containing mercury, precipitation of mercury compounds does not occur.

The mercuric iodide product may be easily separated from the sulfuric acid through a filtering process. The separated mercuric iodide may be further processed for the recovery of iodine, which, in turn, leads to recovery of mercury.

The advantages obtained according to the present invention are as follows: the formation-reaction of mercuric iodide is very rapid and is little dependent on the mercury concentration, a large scale reaction-installation is not required which results in simplicity and convenience from an industrial point of view, the recovery of mercury is possible and the present method is applicable to a highly concentrated sulfuric acid without exerting any effect on the concentration of sulfuric acid in the course of the removal of mercury.

EXAMPLE 1

0.2 g of potassium iodide per 1 kg of sulfuric acid was added to each 3l of industrial sulfuric acid having a concentration of 98 percent and containing mercury in an amount of 5 mg per kg at a temperature of 25°C, and the mixture was stirred and filtered. The present example was directed to an examination of the effects of stirring time and the state of potassium iodide on the removal of mercury. The results are shown in Table 1.

TABLE 1

| Reaction condition | | Hg content before treatment | Hg content after treatment |
|---|---|---|---|
| KI state | Stirring time | | |
| Powder | 1 minute | 5.0 mg/kg | 0.71 mg/kg |
| " | 5 minute | 5.0 " | 0.57 " |
| " | 15 minute | 5.0 " | 0.92 " |
| aqueous solution | 1 minute | 5.0 " | 0.88 " |

Table 1 shows that the reaction rapidly takes place without being affected to an appreciable extent by the state of iodides and the stirring time.

EXAMPLE 2

0.4 g of potassium iodide per 1 kg of sulfuric acid was added to each 3l of sulfuric acid having a wide concentration range of 10 to 90 percent produced from industrial sulfuric acid having a concentration of 98 percent and containing a trace of mercury, and the mixture was stirred for 1 minute and thereafter filtered. The results are shown in Table 2.

Table 2

| Concentration of sulfuric acid | Hg content of sulfuric acid | Addition amount of KI | (Multiple of equivalent) | Hg content after treatment |
|---|---|---|---|---|
| 10 % | 18.9 mg/kg | 0.4 g/kg | (12.8) | * |
| 30 " | 16.5 " | 0.4 " | (14.7) | 13.0 mg/kg |
| 50 " | 14.4 " | 0.4 " | (16.8) | 11.7 " |
| 70 " | 12.5 " | 0.4 " | (19.4) | 2.0 " |
| 70 " | 3.6 " | 0.4 " | (67.3) | 1.20 " |
| 80 " | 4.1 " | 0.4 " | (57.6) | 1.13 " |
| 90 " | 4.6 " | 0.4 " | (53.7) | 0.68 " |

*With addition of KI no sign of the formation of mercuric iodide was observed, and thus no analysis was carried out.

Table 2 shows that with only sulfuric acid having a concentration not less than 70 percent the addition of KI results in remarkable effects.

EXAMPLE 3

0.01 to 0.4 g of potassium iodide per 1 kg of sulfuric acid was added to each 3l of industrial sulfuric acid having a concentration of 98 percent and containing 5 mg of mercury per 1 kg sulfuric acid and sulfuric acid containing the mercury content of 30 mg per kg prepared by adding a solution of mercuric sulfate to said industrial sulfuric acid, respectively, at a temperature of 25°C, and these mixtures were stirred for 1 minute and thereafter filtered. The results are shown in Table 3.

Table 3

| Hg content before treatment | Addition amount of KI | (Multiple of equivalent) | Hg content after treatment |
|---|---|---|---|
| 5 mg/kg | 0.01 g/kg | (1.2) | 1.21 mg/kg |
| 5 " | 0.02 " | (2.4) | 0.92 " |
| 5 " | 0.04 " | (4.8) | 0.82 " |
| 5 " | 0.10 " | (12) | 0.79 " |
| 5 " | 0.20 " | (24) | 0.71 " |
| 5 " | 0.40 " | (48) | 0.87 " |
| 30 " | 0.05 " | (1.0) | 12.2 " |
| 30 " | 0.075 " | (1.5) | 2.5 " |
| 30 " | 0.10 " | (2.0) | 0.65 " |

In view of Table 3, it is apparent that when potassium iodide is added in an amount of 1 to 2 equivalent, the removal efficiency of mercury sharply increases and potassium iodide has selectivity to mercury. Further, an analytical experiment on the form of mercury in sulfuric acid with the mercury content of 5 mg per kg indicated that the portion corresponding to 2.8 mg per kg was in the form of ions and the remaining portion corresponding to 2.2 mg per kg was in the form of metals. From the above facts, it will be apparent that the present invention is useful for both ionic mercury and metallic mercury.

In addition, analysis by X-ray diffraction pattern demonstrated that all mercury iodides were identical to mercuric iodide.

EXAMPLE 4

Potassium iodide was added to each 3 l of industrial sulfuric acid having a concentration of 98 percent and the mercury content of 5 mg per kg at various temperatures.

Potassium iodide was added in an amount of 0.2 g per 1 kg of sulfuric acid (24.2 equivalent) and the resulting mixture was stirred for 1 minute and thereafter filtered. The results are shown in Table 4.

Table 4

| Reaction temperature of sulfuric acid | Hg content before treatment | Hg content after treatment |
|---|---|---|
| 6.5°C | 5.0 mg/kg | 0.51 mg/kg |
| 14 " | 5.0 " | 0.52 " |
| 25 " | 5.0 " | 0.81 " |
| 33 " | 5.0 " | 1.24 " |
| 45 " | 5.0 " | 2.73 " |
| 75 " | 5.0 " | 3.30 " |

In view of Table 4, it is evident that the formation of mercuric iodide depends upon the temperature of sulfuric acid even if some amount of scatter in temperature during filtering, volatalization of some iodine or the amount of scatter in measured values by analytical errors are taken into consideration.

EXAMPLE 5

Various kinds of iodides were added to each 1 l of industrial concentrated sulfuric acid having a concentration of 98.5 percent and containing a trace of mercury at a temperature of 30°C. The mixture was then stirred for 1 minute and filtered. The results are shown in Table 5.

Table 5

| Iodide | Hg content before treatment | Addition amount | (equivalent) | Hg content after treatment |
|---|---|---|---|---|
| NaI | 6.3 mg/kg | 0.05g/kg | (4.8) | 1.90 mg/kg |
| " | 6.7 mg/kg | 0.10 " | (10.0) | 1.24 " |
| " | 30 " | 0.05 " | (1.01) | 2.28 " |
| " | 30 " | 0.10 " | (2.02) | 1.25 " |
| NH$_4$I | 6.7 " | 0.10 " | (10.3) | 2.11 " |
| CaI$_2$.6H$_2$O | 6.7 " | 0.10 " | (7.5) | 1.74 " |
| HI | 6.7 " | 0.10 " | (11.7) | 1.20 " |

Table 5 shows that all iodides are useful for removing mercury from sulfuric acid.

EXAMPLE 6

Each 500 g of two kinds of sulfuric acids with the mercury content of 30.9 and 95.7 mg per 1 kg of sulfuric acid were prepared by adding a solution of mercuric sulfate to industrial sulfuric acid having a concentration of 98 percent. These sulfuric acids were allowed to cool to a temperature of 5°C. 50 mg of potassium iodide was added to one cooled sulfuric acid, while 160 mg of potassium iodide was added to the other sulfuric acids and they were respectively reacted. After standing for an hour, these reaction mixtures were filtered over a glass filter pre-coated with diatomaceous earth. The amount of potassium iodide added corresponded to twice the theoretical amount required for removing the mercury. Filtering was carried out while maintaining the reaction mixtures at a temperature of 5°C.

Analysis of the filtered acids by atom absorptiometric method indicated that the contents of mercury were 0.22 and 0.2 mg per 1 kg of sulfuric acid, respectively.

EXAMPLE 7

500 g of sulfuric acid with the mercury content of 95.7 mg per kg was prepared by adding a solution of mercuric sulfate to industrial sulfuric acid having a concentration of 98 percent. The resultant sulfuric acid was allowed to cool to a temperature of 10°C and to this acid was added 160 mg of potassium iodide corresponding to twice the theoretical amount required for removing the mercury to react them. After standing for an hour, the reaction mixture was filtered over a glass filter pre-coated with diatomaceous earth while maintaining it at a temperature of 10°C.

The filtered acid had the mercury content of 0.26 mg per kg.

EXAMPLE 8

500 g of sulfuric acid with the mercury content of 30.9 mg per 1 kg sulfuric acid was prepared by adding a solution of mercuric sulfate to industrial sulfuric acid having a concentration of 98 percent. The resultant sulfuric acid was allowed to cool to a temperature of 15°C and to this acid was added 50 mg of potassium iodide. The reaction mixture was filtered and analyzed in the same manner as that indicated in Examples 6 and 7. The reaction mixture was maintained at a temperature of 15°C until filtering was complete.

The mercury content of the filtered acid was found to be 0.45 mg per kg.

COMPARATIVE EXAMPLE 1

500 g of sulfuric acid with the mercury content of 6.3 mg per kg was prepared by adding a solution of mercuric sulfate to industrial sulfuric acid having a concentration of 98 percent. To the resultant sulfuric acid which showed a temperature of 22°C was added 50 mg of potassium iodide and they were reacted. After standing for an hour the reaction mixture was filtered over a glass filter pre-coated with diatomaceous earth. The amount of the potassium iodide added corresponded to about 10 times the theoretical amount. The filtration after reaction was carried out without maintaining the reaction mixture at constant temperature, so that the filtered acid showed a temperature of 26°C.

The mercury content of the filtered acid was analyzed to be 0.70 mg per kg.

COMPARATIVE EXAMPLE 2

500 g of sulfuric acid with the mercury content of 30.9 mg per kg was prepared by adding a solution of mercuric iodide to industrial sulfuric acid having a concentration of 98 percent. The resultant sulfuric acid was allowed to cool to a temperature of 15°C and to the cooled acid was added 50 mg of potassium iodide to react them. After reaction, the reaction mixture was not specially maintained at constant temperature, so that the filtered acid showed a temperature of 29°C after filtering was complete.

The mercury content of the filtered acid was analyzed to be 0.77 mg per kg.

The above-mentioned examples and comparative examples clearly indicate that the temperature of the reaction mixture is desirably maintained at temperatures not higher than 15°C, preferably not higher than 10°C throughout the reaction step to the filtration step, and that the maximum temperature of the reaction mixture should be desirably limited to 15°C even if it tends to increase in the course of the process.

EXAMPLE 9

500 g of industrial sulfuric acid having a concentration of 98 percent and containing 5.0 mg of mercury per 1 kg sulfuric acid was allowed to cool to a temperature of 10°C and to this sulfuric acid was added 0.1 ml of reagent grade hydroiodic acid having a specific gravity of 1.7 and a hydrogen iodide concentration of 57 percent and they were reacted. After standing for an hour while maintaining the reaction mixture at a temperature of 10°C, the reaction mixture was filtered in the same manner as that in Example 6. During filtering the reaction mixture was also maintained at a temperature of 10°C. After removing the residual iodine the filtered acid was analyzed by atom absorptiometric method and the mercury content thereof was found to be 0.21 mg per kg.

EXAMPLE 10

500 g of industrial sulfuric acid having a concentration of 98 percent and containing 5.0 mg of mercury per 1 kg of sulfuric acid was allowed to cool to a temperature of 10°C and to this cooled sulfuric acid was added 25 mg of reagent grade sodium iodide and they were reacted. The amount of the sodium iodide added corresponded to about 3 times the theoretical amount required for removing the mercury. After standing for an hour the reaction mixture was filtered in the same manner as that in the preceding examples 6 and 7. During filtering the reaction mixture was kept at a temperature of 10°C. After removing the residual iodine the filtered acid was analyzed by atom absorptiometric method and the mercury content thereof was found to be 0.25 mg per kg.

What we claim is:

1. A method of removing mercury from a highly concentrated sulfuric acid having a concentration of not less than 70 percent and containing a trace of mercury which comprises adding iodides to said sulfuric acid at a temperature up to 45°C to precipitate the mercury contained therein as mercuric iodide, and removing the precipitate from said sulfuric acid.

2. A method according to claim 1 wherein the amount of the iodides added equals to at least chemical equivalent required to convert the mercury to mercuric iodide.

3. The method according to claim 2 wherein the amount of the iodides added equals to 1 to 2 times chemical equivalent required to convert the mercury to the mercuric iodide.

4. The method according to claim 1 wherein said sulfuric acid is maintained at a temperature of not higher than 30°C.

5. The method according to claim 1 wherein said sulfuric acid is maintained at a temperature of not higher than 15°C.

6. The method according to claim 1 wherein said sulfuric acid is maintained at a temperature of not higher than 10°C.

7. The method according to claim 1 wherein said removing of the precipitate is carried out by filtering.

8. The method according to claim 1 wherein said iodide is potassium iodide.

9. The method according to claim 1 wherein said iodide is hydrogen iodide.

10. The method according to claim 1 wherein said iodide is sodium iodide.

11. The method according to claim 1 wherein said iodide is selected from the group consisting of ammonium iodide and calcium iodide.

12. The method according to claim 1 wherein the mercury contained in the sulfuric acid is in the form of ions.

13. The method according to claim 1 wherein the mercury contained in the sulfuric acid is in the form of metal.

14. The method according to claim 1 wherein the mercury contained in the sulfuric acid is a mixture of ionic and metallic mercury.

15. The method according to claim 1, wherein said sulfuric acid has a concentration of higher than 80 percent.

16. The method as claimed in claim 1, wherein said sulfuric acid has a concentration of not less than 90 percent.

* * * * *